(12) United States Patent
Naito et al.

(10) Patent No.: US 6,643,384 B1
(45) Date of Patent: Nov. 4, 2003

(54) WATERMARK DATA HIDING APPARATUS, A METHOD OF HIDING WATERMARK DATA, A METHOD OF TRANSMITTING DATA INCLUDING WATERMARK DATA, A RECORDING MEDIUM STORING DATA INCLUDING WATERMARK DATA, A DATA AND WATERMARK DATA READING APPARATUS, AND A METHOD OF READING DATA AND WATERMARK DATA

(75) Inventors: Joji Naito, Yokosuka (JP); Kazuo Hikawa, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/497,764

(22) Filed: Feb. 4, 2000

(30) Foreign Application Priority Data

Mar. 31, 1999 (JP) ............................................ 11-091686
Sep. 30, 1999 (JP) ............................................ 11-279715

(51) Int. Cl.⁷ ................................................ G06K 9/00
(52) U.S. Cl. ........................ 382/100; 713/176; 380/202
(58) Field of Search ........................ 382/100; 713/176; 380/202; 341/143; 717/128; 375/240.2; 369/59.12; 370/445

(56) References Cited

U.S. PATENT DOCUMENTS

| | | | | |
|---|---|---|---|---|
| 5,960,081 A | * | 9/1999 | Vynne et al. ................ | 713/176 |
| 6,011,849 A | * | 1/2000 | Orrin .......................... | 380/42 |
| 6,037,984 A | * | 3/2000 | Isnardi et al. .......... | 375/240.21 |
| 6,131,161 A | * | 10/2000 | Linnartz ..................... | 713/176 |
| 6,157,330 A | * | 12/2000 | Bruekers et al. ............ | 341/143 |
| 6,208,745 B1 | * | 3/2001 | Florencio et al. ........... | 382/100 |
| 6,330,335 B1 | * | 12/2001 | Rhoads ....................... | 380/252 |
| 6,400,826 B1 | * | 6/2002 | Chen et al. ................. | 382/100 |
| 2002/0009208 A1 | * | 1/2002 | Alattar et al. ............... | 382/100 |
| 2003/0026453 A1 | * | 2/2003 | Sharma et al. .............. | 382/100 |
| 2003/0031318 A1 | * | 2/2003 | Troyansky et al. ......... | 380/202 |
| 2003/0033530 A1 | * | 2/2003 | Sharma et al. .............. | 713/176 |
| 2003/0053653 A1 | * | 3/2003 | Rhoads ....................... | 382/100 |

FOREIGN PATENT DOCUMENTS

| | | |
|---|---|---|
| EP | 0840513 | 5/1998 |
| EP | 0892544 | 1/1999 |
| JP | 9-191394 | 7/1997 |
| JP | 11-265179 | 9/1999 |
| JP | 11-327546 | 11/1999 |
| JP | 11-327547 | 11/1999 |

OTHER PUBLICATIONS

Wlolfram Szepanski, A Signal Theoretic Method for Ceating Forgery–Proof Documents for Automatic Verification.*
U.S.S.N. 09/267,603 filed Mar. 15, 1999.

* cited by examiner

Primary Examiner—Bhavesh M. Mehta
Assistant Examiner—Barry Choobin
(74) Attorney, Agent, or Firm—Louis Woo

(57) ABSTRACT

The error detection code adding circuit adds error detection codes to watermark data. An encrypting circuit encrypts the error detection code added watermark data according to a first password. N encoders hide (embed) the encrypted error detection code added watermark data in the content data by N different hiding algorithms, respectively. A selector selects one of N encoders in response to a selection signal and outputs the encoded and selected content data in which the encrypted error detection code added watermark data is hidden. N decoders read watermark data and the error detection codes from the encoded content data by N extracting algorithms corresponding to the N hiding algorithms, respectively, to output N extracted content data including N read watermark data and N error detection codes and N read watermark data, respectively. Decrypting circuits decrypt the N read watermark data and the N error detection codes from the N encoders according to a second password corresponding to the first password, respectively. The error detecting circuits for detecting errors in the N error detection codes, respectively. The selector selects and outputs one of the N extracted (inverse-hidden) contents data according to the detected errors.

6 Claims, 2 Drawing Sheets

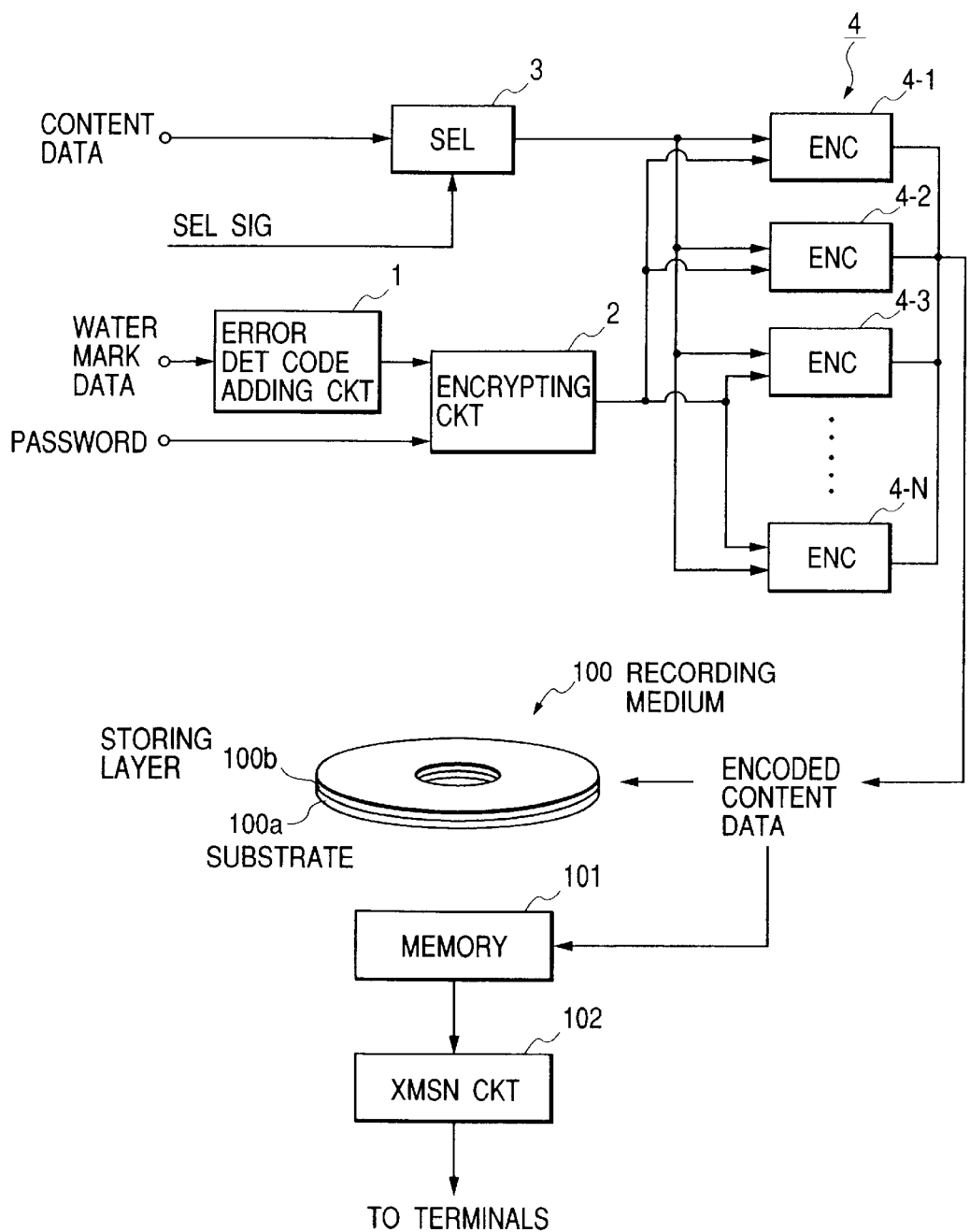

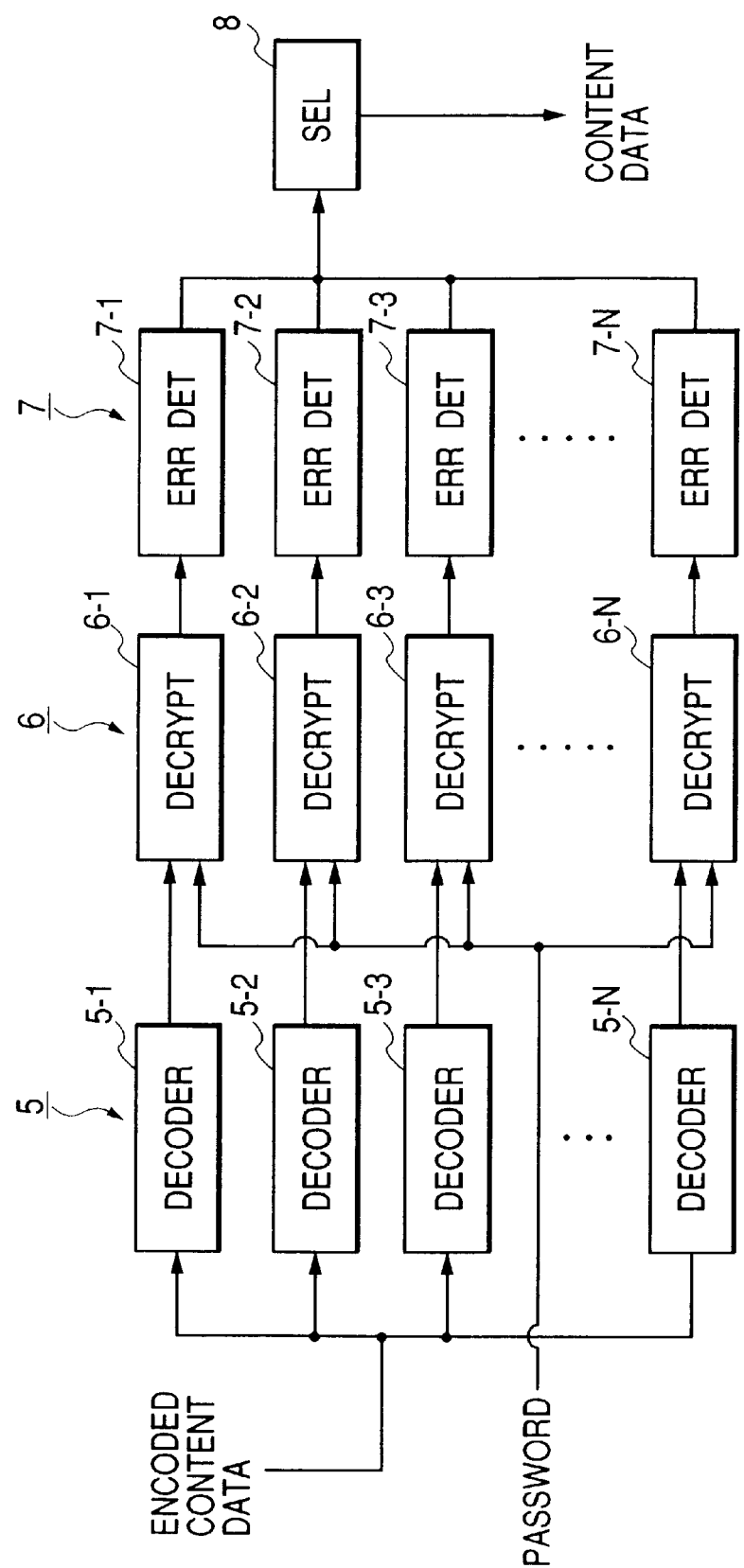

WATERMARK DATA HIDING APPARATUS, A METHOD OF HIDING WATERMARK DATA, A METHOD OF TRANSMITTING DATA INCLUDING WATERMARK DATA, A RECORDING MEDIUM STORING DATA INCLUDING WATERMARK DATA, A DATA AND WATERMARK DATA READING APPARATUS, AND A METHOD OF READING DATA AND WATERMARK DATA

BACKGROUND OF THE INVENTION

1. Field of the Invention

This invention relates to a watermark data hiding (embedding) apparatus, a method of hiding (embedding) watermark data, a method of transmitting data including watermark data, a recording medium storing data including watermark data, a (data and) watermark data reading apparatus, and a method of reading data and watermark data.

2. Description of the Prior Art

A digital watermark technique is known. In such a digital watermark technique, watermark data is hidden (embedded) in a redundancy portion of video data or sound data so as not to change the total amount of data, so that the watermark data cannot be detected in the human sensitivity.

SUMMARY OF THE INVENTION

The aim of the present invention is to provide a superior watermark data hiding apparatus, a superior method of hiding watermark data, a superior method of transmitting data including watermark data, a superior recording medium storing data including watermark data, and a superior (data and) watermark data reading apparatus, and a superior method of reading data and watermark data.

According to the present invention there is provided a watermark data hiding apparatus including: an error detection code adding circuit for adding error detection codes to watermark data to generate error detection code added watermark data; an encryption circuit for scrambling the error detection code added watermark data in accordance with an inputted password; a plurality of watermark data hiding circuits for hiding the encrypted error detection code added watermark data in the content data by different hiding algorithms, respectively; and a selecting circuit responsive to a selection signal for selecting one of a plurality of the watermark data hiding circuits to output the content data in which the encrypted error detection code added watermark data is hidden by the selected watermark data hiding circuit.

According to the present invention there is provided a method of hiding watermark data in content data including steps of: adding error detection codes to watermark data to generate error detection code added watermark data; encrypting the error detection code added watermark data in accordance with an inputted password; hiding the encrypted error detection code added watermark data in the content data by different hiding algorithms, respectively; and selecting one of different hiding algorithms in response to a selection signal to output the content data in which the encrypted error detection code added watermark data is hidden by the selected one of different hiding algorithms.

The content data in which the encrypted error detection code added watermark data is hidden by one of different hiding algorithms may be transmitted.

According to the present invention there is provided a recording medium including: a substrate; and a data storing layer for storing content data, watermark data, and error detection codes of the watermark data, wherein the error detection codes are added to the watermark data to generate error detection code added watermark data, the error detection code added watermark data is encrypted in accordance with an inputted password; the encrypted error detection code added watermark data is hidden in the content data by different hiding algorithms, respectively, one of different hiding algorithms is selected in response to a selection signal, and the content data in which the encrypted error detection code added watermark data is hidden by the selected one of different hiding algorithms.

According to the present invention there is provided a watermark data reading apparatus, wherein the watermark data is attached with error detection codes, the watermark data and the error detection codes are encrypted in accordance with a first password, the watermark data and the error detection codes are hidden in the content data by the selected one of N hiding algorithms in response to a selection signal to output the content data in which the error detection code and watermark data is hidden by the selected one of N hiding algorithms, N being a natural number more than one, the watermark data reading apparatus including: N decoders for reading watermark data and the error detection codes from the content data by N extracted (inverse-hiding) algorithms corresponding to the N extracting (hiding) algorithms, respectively, to output N inverse-hidden content data including the N read watermark data and the N error detection codes; N decrypting circuits for decrypting the N read watermark data and the N error detection codes from the reading circuit in accordance with a second password corresponding to the first password, respectively; N error detecting circuits for detecting errors in the N error detection codes, respectively; and a selecting circuit for selecting and outputting one of the N inverse-hidden content data in accordance with the errors.

According to the present invention there is provided a method of reading content data and watermark data hidden in the content data, wherein the watermark data is attached with error detection codes, the watermark data and the error detection codes are encrypted in accordance with a first password, the watermark data and the error detection codes are hidden in the content data by N hiding algorithms, respectively; one of N hiding algorithms is selected in response to a selection signal to output the content data in which the error detection code added watermark data is hidden by the one of N hiding algorithms, N being a natural number more than one, the method including the steps of: (a) reading watermark data and the error detection codes from the content data by N extracting (inverse-hiding) algorithms corresponding to the N hiding algorithms, respectively to output N extracted (inverse-hidden) contents data including the N read watermark data and the N error detection codes; (b) decrypting the N read watermark data and the N error detection codes in step (a) in accordance with a second password corresponding to the first password, respectively; (c) detecting errors in the N error detection codes, respectively; and (d) selecting and outputting one of the N inverse-hidden contents data in accordance with errors detected in step (c).

BRIEF DESCRIPTION OF THE DRAWINGS

The object and features of the present invention will become more readily apparent from the following detailed description taken in connection with the accompanying drawings in which:

FIG. 1 is a block diagram of an embodiment of a watermark data hiding (embedding) apparatus; and FIG. 2 is a block diagram of this embodiment of a (data and) watermark data reading apparatus.

The same or corresponding elements or parts are designated with like references throughout the drawings.

DETAILED DESCRIPTION OF THE INVENTION

FIG. 1 is a block diagram of an embodiment of a watermark data hiding apparatus.

The watermark data hiding apparatus includes: an error detection code adding circuit 1 for generating error detection codes in accordance with watermark data and adding the generated error detection codes to watermark data to generate error detection code added watermark data; an encrypting circuit 2 for encrypting the error detection code added watermark data in accordance with an inputted password; N encoders (watermark data hiding circuits) 4 for hiding (embedding) the encrypted error detection code added watermark data in the content data by N different hiding algorithms, respectively; and a selector 3 responsive to a selection signal for selecting one of the N encoders to output the content data in which the encrypted error detection code added watermark data is hidden.

The error detection code adding circuit 1 generates the error detection codes in accordance with the watermark data and adds the error detection codes to the watermark data to generate the error detection code added watermark data. The encrypting circuit 2 encrypts the error detection code added watermark data in accordance with an inputted password. N encoders 4 hide (embed) the encrypted error detection code added watermark data in the content data by N different hiding algorithms, respectively. The selector 3 selects one of the N encoders in response to the selection signal and outputs the content data in which the encrypted error detection code added watermark data is hidden.

The encoded and selected content data including the contents data, watermark data, and error detection codes of the watermark data is recorded in a recording medium 100 or stored in a memory 101 and transmitted by a transmitting circuit 102 as a radio wave by an antenna, an optical signal by an optical device, an electric transmission signal through a cable to terminals. The recording medium 100 includes a substrate 100a and a storing layer 100b for storing the content data in which the encrypted error detection code added watermark data is hidden.

According to the embodiment mentioned above, there is further provided a method of hiding watermark data in content data including steps of: adding the error detection codes to the watermark data to generate the error detection code added watermark data; encrypting the error detection code added watermark data in accordance with an inputted password; hiding the encrypted error detection code added watermark data in the content data by different hiding algorithms, respectively; and selecting one of different hiding algorithms in response to the selection signal to output the content data in which the encrypted error detection code added watermark data is hidden by the selected one of different hiding algorithms.

FIG. 2 is a block diagram of this embodiment of a data and watermark data reading apparatus.

The data and watermark data reading apparatus of this invention is supplied with the encoded and selected content data from the watermark data hiding apparatus of this embodiment. That is, the encoded content data is derived as follows:

The watermark data is attached with error detection codes and the watermark data and the error detection codes are encrypted in accordance with a first password. The watermark data and the error detection codes are hidden in the content data by N hiding algorithms, respectively, one of N hiding algorithms is selected in response to a selection signal to output the content data in which the error detection code added watermark data is hidden by the one of N hiding algorithms. N is a natural number more than one.

The data and watermark data reading apparatus of this embodiment includes N decoders 5-1 to 5-N for reading watermark data and the error detection codes from the encoded content data by N extracting (inverse-hiding) algorithms corresponding to the N hiding algorithms in encoders 4, respectively, to output N sets of extracted (inverse-hidden) content data, each set including the read watermark data and the error detection codes; N decrypting circuits 6-1 to 6-N for decrypting the N sets of data from the N encoders 5-1 to 5-N in accordance with a second password corresponding to the first password, respectively; N error detecting circuits 7-1 to 7-N for detecting errors in the N error detection codes, respectively; and a selector 8 for selecting and outputting one of the N extracted (inverse-hidden) content data in accordance with the detected errors from the error detection circuits 7-1 to 7-N.

N decoders 5-1 to 5-N read watermark data and the error detection codes from the encoded and selected content data by N extracting (inverse-hiding) algorithms corresponding to the N hiding algorithms, respectively, to output N extracted (inverse-hidden) content data including the N read watermark data and the N error detection codes. The decrypting circuits 6-1 to 6-N decrypt the N sets of read watermark data and the error detection codes from the N encoders 5-1 to 5-N in accordance with a second password corresponding to the first password, respectively. The error detecting circuits 7-1 to 7-N detect errors in the N error detection codes, respectively. The selector 8 selects and outputs one of the N extracted (inverse-hidden) contents data in accordance with the detected errors. That is, the selector 8 selects one of the content data including the watermark data showing no error or the lowest error rate.

According to the above-mentioned embodiment, there is further provided a method of reading the content data and watermark data hidden in the content data, the method including the steps of: (a) reading the watermark data and the error detection codes from the encoded content data by N inverse-hiding algorithms corresponding to the N hiding algorithms, respectively, to output N extracted (inverse-hidden) content data including the N read watermark data and N error detection codes; (b) decrypting the N read watermark data and the N error detection codes in step (a) in accordance with a second password corresponding to the first password, respectively; (c) detecting errors in the N error detection codes, respectively; and (d) selecting and outputting one of the N extracted (inverse-hidden) contents data in accordance with errors detected in step (c). The input encoded content data may be read from the recording medium 100 or the memory 101, or the encoded content data may be transmitted as mentioned above and received by a receiving circuit (not shown) including an antenna or an input terminal and supplied to the decoders 5-1 to 5-N.

What is claimed is:

1. A watermark data hiding apparatus comprising:
   error detection code adding means for adding error detection codes to watermark data to generate error detection code added watermark data;
   encrypting means for encrypting said error detection code added watermark data in accordance with an inputted password;

a plurality of watermark data hiding means for hiding said encrypted error detection code added watermark data in content data by different hiding algorithms, respectively; and selecting means responsive to a selection signal for selecting one of said watermark data hiding means to output said encoded and selected content data in which said encrypted error detection code added watermark data is hidden by said selected one of said watermark data hiding means.

2. A method of hiding watermark data in content data comprising the steps of:

adding error detection codes to watermark data to generate error detection code added watermark data;

encrypting said error detection code added watermark data in accordance with an inputted password;

hiding said encrypted error detection code added watermark data in said content data by different hiding algorithms, respectively; and selecting one of different hiding algorithms in response to a selection signal to output said encoded and selected content data in which said encrypted error detection codes added watermark data is hidden by said selected one of different hiding algorithms.

3. A method of transmitting content data including watermark data comprising the steps of:

adding error detection to watermark data to generate error detection code added watermark data;

encrypting said error detection code added watermark data in accordance with an inputted password;

hiding said encrypted error detection code added watermark data in said content data by different hiding algorithms, respectively;

selecting one of different hiding algorithms in response to a selection signal; and transmitting said encoded content data in which said encrypted error detection code added watermark data is hidden by said one of different hiding algorithms.

4. A recording medium comprises:

a substrate; and a data storing layer for storing content data, watermark data, and error detection codes of said watermark data, wherein said error detection codes are added to said watermark data to generate error detection code added watermark data, said error detection code added watermark data is encrypted in accordance with an inputted password; said encrypted error detection code added watermark data is hidden in said content data by different hiding algorithms, respectively, one of different hiding algorithms is selected in response to a selection signal, and said content data in which said encrypted error detection code added watermark data is hidden by said selected one of different hiding algorithms.

5. A watermark data reading apparatus, wherein said watermark data is attached with error detection codes, said watermark data and said error detection codes are encrypted in accordance with a first password and said watermark data, said error detection codes are hidden in said content data by one of N different hiding algorithms selected in response to a selection signal to output said encoded content data in which said error detection code and watermark data is hidden by said selected one of N different hiding algorithms, N being a natural number more than one, said watermark data reading apparatus comprising:

reading means for reading said watermark data and said error detection codes from said encoded content data by N extracting algorithms corresponding to said N hiding algorithms, respectively, to output N sets of extracted content data including said read watermark data and said error detection codes;

decrypting means for decrypting said N read watermark data and said N error detection codes from said reading means in accordance with a second password corresponding to said first password, respectively;

detecting means for detecting errors in said N error detection codes from said decrypting means, respectively; and selecting means for selecting and outputting one of said N extracted content data in accordance with said errors.

6. A method of reading content data and watermark data hidden in said content data, wherein said watermark data is attached with error detection codes, said watermark data and said error detection codes are encrypted in accordance with a first password and said watermark data, said error detection codes are hidden in said content data by N hiding algorithms, respectively; one of N hiding algorithms is selected in response to a selection signal to output said encoded content data in which said error detection code and watermark data is hidden by said one of N hiding algorithms, N being a natural number more than one, said method comprising the steps of:

(a) reading said watermark data and said error detection codes from the encoded content data by N extracting algorithms corresponding to said N hiding algorithms, respectively, to output N extracted content data including said N read watermark data and said N error detection codes;

(b) decrypting said N read watermark data and said N error detection codes in step (a) in accordance with a second password corresponding to said first password, respectively;

(c) detecting errors in said N error detection codes, respectively; and (d) selecting and outputting one of said N extracted contents data in accordance with said errors detected in step (c).

* * * * *